United States Patent
Park et al.

(10) Patent No.: US 11,622,368 B2
(45) Date of Patent: Apr. 4, 2023

(54) TRANSMITTING MULTIPLE DOWNLINK CONTROL INFORMATION MESSAGES IN A CONTROL RESOURCE SET

(71) Applicant: QUALCOMM Incorporated, San Diego, CA (US)

(72) Inventors: Sungwoo Park, Seoul (KR); Mostafa Khoshnevisan, San Diego, CA (US); Tao Luo, San Diego, CA (US); Jing Sun, San Diego, CA (US); Xiaoxia Zhang, San Diego, CA (US); Arumugam Chendamarai Kannan, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 17/115,475

(22) Filed: Dec. 8, 2020

(65) Prior Publication Data
US 2021/0235483 A1     Jul. 29, 2021

Related U.S. Application Data

(60) Provisional application No. 62/966,424, filed on Jan. 27, 2020.

(51) Int. Cl.
*H04W 72/12*     (2009.01)
*H04W 72/04*     (2009.01)
(Continued)

(52) U.S. Cl.
CPC ........ *H04W 72/1289* (2013.01); *H04B 7/024* (2013.01); *H04B 7/0413* (2013.01);
(Continued)

(58) Field of Classification Search
CPC .......... H04W 72/1289; H04W 72/042; H04W 72/0466; H04W 72/1263; H04W 72/1268;
(Continued)

(56) References Cited

U.S. PATENT DOCUMENTS

2020/0119869 A1\* 4/2020 Taherzadeh Boroujeni ................ H04B 7/0695
2020/0153581 A1\* 5/2020 Tsai .................... H04L 27/2649
(Continued)

OTHER PUBLICATIONS

"Portion," Web page <https://www.merriam-webster.com/dictionary/portion>, 2 pages, Sep. 22, 2019, retrieved from Internet Archive Wayback Machine <https://web.archive.org/web/20190922223215/https://www.merriam-webster.com/dictionary/portion> on Nov. 10, 2022. (Year: 2019).\*

*Primary Examiner* — Joshua Kading
(74) *Attorney, Agent, or Firm* — Harrity & Harrity, LLP

(57) ABSTRACT

Various aspects of the present disclosure generally relate to wireless communication. In some aspects, a user equipment (UE) may receive a first control signal in a control resource set (CORESET) from a first transmit receive point (TRP), wherein the first control signal includes a set of control channel elements (CCEs) to encode a first portion of a first downlink control information (DCI) message and/or a first portion of a second DCI message. The UE may receive a second control signal in the CORESET from a second TRP, wherein the second control signal includes the set of CCEs to encode a second portion of the first DCI message and/or a second portion of the second DCI message. Numerous other aspects are provided.

30 Claims, 9 Drawing Sheets

(51) Int. Cl.
*H04B 7/024* (2017.01)
*H04L 5/00* (2006.01)
*H04B 7/06* (2006.01)
*H04B 7/0413* (2017.01)
*H04L 25/03* (2006.01)
*H04L 1/06* (2006.01)
*H04L 1/00* (2006.01)
*H04W 28/06* (2009.01)
*H04W 72/044* (2023.01)
*H04L 1/1607* (2023.01)
*H04W 4/30* (2018.01)

(52) U.S. Cl.
CPC ......... *H04B 7/0613* (2013.01); *H04B 7/0697* (2013.01); *H04L 1/001* (2013.01); *H04L 1/0618* (2013.01); *H04L 5/0053* (2013.01); *H04L 5/0094* (2013.01); *H04L 25/03929* (2013.01); *H04W 28/06* (2013.01); *H04W 72/042* (2013.01); *H04W 72/0466* (2013.01); *H04L 1/1671* (2013.01); *H04L 5/0023* (2013.01); *H04W 4/30* (2018.02)

(58) Field of Classification Search
CPC ......... H04W 72/1273; H04W 72/1278; H04W 72/14; H04W 28/06; H04W 4/30; H04B 7/024; H04B 7/0413; H04B 7/0613; H04B 7/0697; H04B 7/0619; H04B 7/0626; H04B 7/0632; H04B 7/0686; H04L 1/001; H04L 1/0618; H04L 1/1671; H04L 5/0053; H04L 5/0094; H04L 5/0023; H04L 25/03929; H04L 2012/4629
See application file for complete search history.

(56) References Cited

U.S. PATENT DOCUMENTS

| | | | |
|---|---|---|---|
| 2021/0345308 A1* | 11/2021 | Liu | H04W 72/042 |
| 2022/0085931 A1* | 3/2022 | Mon | H04W 72/044 |
| 2022/0224482 A1* | 7/2022 | Kim | H04W 72/1289 |
| 2022/0294578 A1* | 9/2022 | Kim | H04L 1/00 |

* cited by examiner

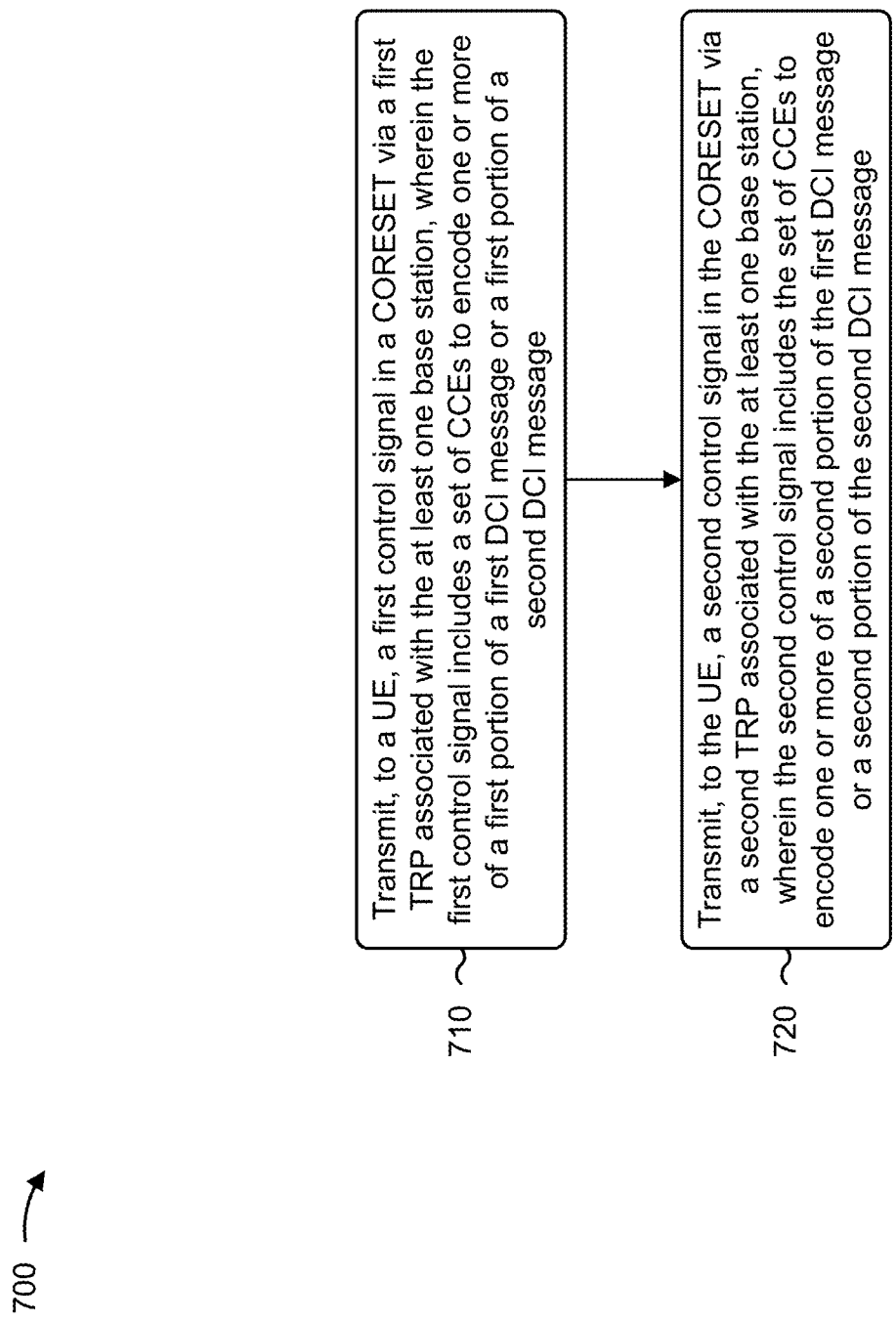

TRANSMITTING MULTIPLE DOWNLINK CONTROL INFORMATION MESSAGES IN A CONTROL RESOURCE SET

CROSS-REFERENCE TO RELATED APPLICATION

This patent application claims priority to U.S. Provisional patent Application No. 62/966,424, filed on Jan. 27, 2020, entitled "TRANSMITTING MULTIPLE DOWNLINK CONTROL INFORMATION MESSAGES IN A CONTROL RESOURCE SET," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for transmitting multiple downlink control information (DCI) messages in a control resource set (CORESET).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some aspects, a method of wireless communication, performed by a user equipment (UE), may include: receiving a first control signal in a control resource set (CORESET) from a first transmit receive point (TRP), wherein the first control signal includes a set of control channel elements (CCEs) to encode one or more of a first portion of a first downlink control information (DCI) message or a first portion of a second DCI message; and receiving a second control signal in the CORESET from a second TRP, wherein the second control signal includes the set of CCEs to encode one or more of a second portion of the first DCI message or a second portion of the second DCI message.

In some aspects, a method of wireless communication, performed by at least one base station, may include: transmitting, to a UE, a first control signal in a CORESET via a first TRP associated with the at least one base station, wherein the first control signal includes a set of CCEs to encode one or more of a first portion of a first DCI message or a first portion of a second DCI message; and transmitting, to the UE, a second control signal in the CORESET via a second TRP associated with the at least one base station, wherein the second control signal includes the set of CCEs to encode one or more of a second portion of the first DCI message or a second portion of the second DCI message.

In some aspects, a UE for wireless communication may include a memory and one or more processors operatively coupled to the memory. The memory and the one or more processors may be configured to receive a first control signal in a CORESET from a first TRP, wherein the first control signal includes a set of CCEs to encode one or more of a first portion of a first DCI message or a first portion of a second DCI message; and receive a second control signal in the CORESET from a second TRP, wherein the second control signal includes the set of CCEs to encode one or more of a second portion of the first DCI message or a second portion of the second DCI message.

In some aspects, a base station for wireless communication may include a memory and one or more processors operatively coupled to the memory. The memory and the one or more processors may be configured to transmit, to a UE, a first control signal in a CORESET via a first TRP associated with the at least one base station, wherein the first control signal includes a set of CCEs to encode one or more of a first portion of a first DCI message or a first portion of a second DCI message; and transmit, to the UE, a second control signal in the CORESET via a second TRP associated with the at least one base station, wherein the second control signal includes the set of CCEs to encode one or more of a second portion of the first DCI message or a second portion of the second DCI message.

In some aspects, a non-transitory computer-readable medium may store one or more instructions for wireless communication. The one or more instructions, when executed by one or more processors of a UE, may cause the one or more processors to: receive a first control signal in a CORESET from a first TRP, wherein the first control signal includes a set of CCEs to encode one or more of a first portion of a first DCI message or a first portion of a second DCI message; and receive a second control signal in the CORESET from a second TRP, wherein the second control signal includes the set of CCEs to encode one or more of a second portion of the first DCI message or a second portion of the second DCI message.

In some aspects, a non-transitory computer-readable medium may store one or more instructions for wireless communication. The one or more instructions, when executed by one or more processors of a base station, may cause the one or more processors to: transmit, to a UE, a first control signal in a CORESET via a first TRP associated with the at least one base station, wherein the first control signal includes a set of CCEs to encode one or more of a first portion of a first DCI message or a first portion of a second DCI message; and transmit, to the UE, a second control signal in the CORESET via a second TRP associated with the at least one base station, wherein the second control signal includes the set of CCEs to encode one or more of a second portion of the first DCI message or a second portion of the second DCI message.

In some aspects, an apparatus for wireless communication may include: means for receiving a first control signal in a CORESET from a first TRP, wherein the first control signal includes a set of CCEs to encode one or more of a first portion of a first DCI message or a first portion of a second DCI message; and means for receiving a second control signal in the CORESET from a second TRP, wherein the second control signal includes the set of CCEs to encode one or more of a second portion of the first DCI message or a second portion of the second DCI message.

In some aspects, an apparatus for wireless communication may include: means for transmitting, to a UE, a first control signal in a CORESET via a first TRP associated with the apparatus, wherein the first control signal includes a set of CCEs to encode one or more of a first portion of a first DCI message or a first portion of a second DCI message; and means for transmitting, to the UE, a second control signal in the CORESET via a second TRP associated with the apparatus, wherein the second control signal includes the set of CCEs to encode one or more of a second portion of the first DCI message or a second portion of the second DCI message.

Aspects generally include a method, apparatus, system, computer program product, non-transitory computer-readable medium, user equipment, base station, transmit receive point, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
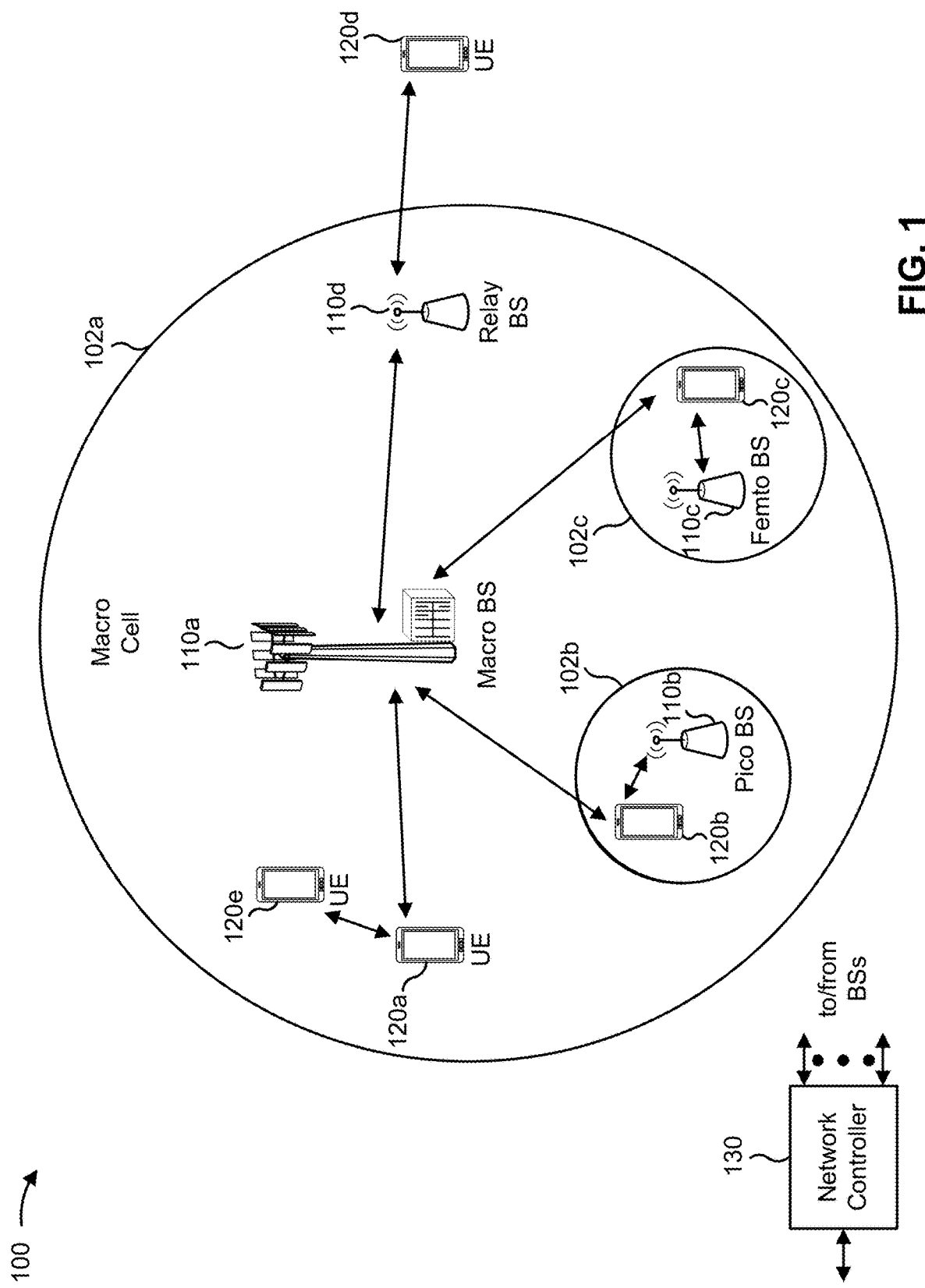
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
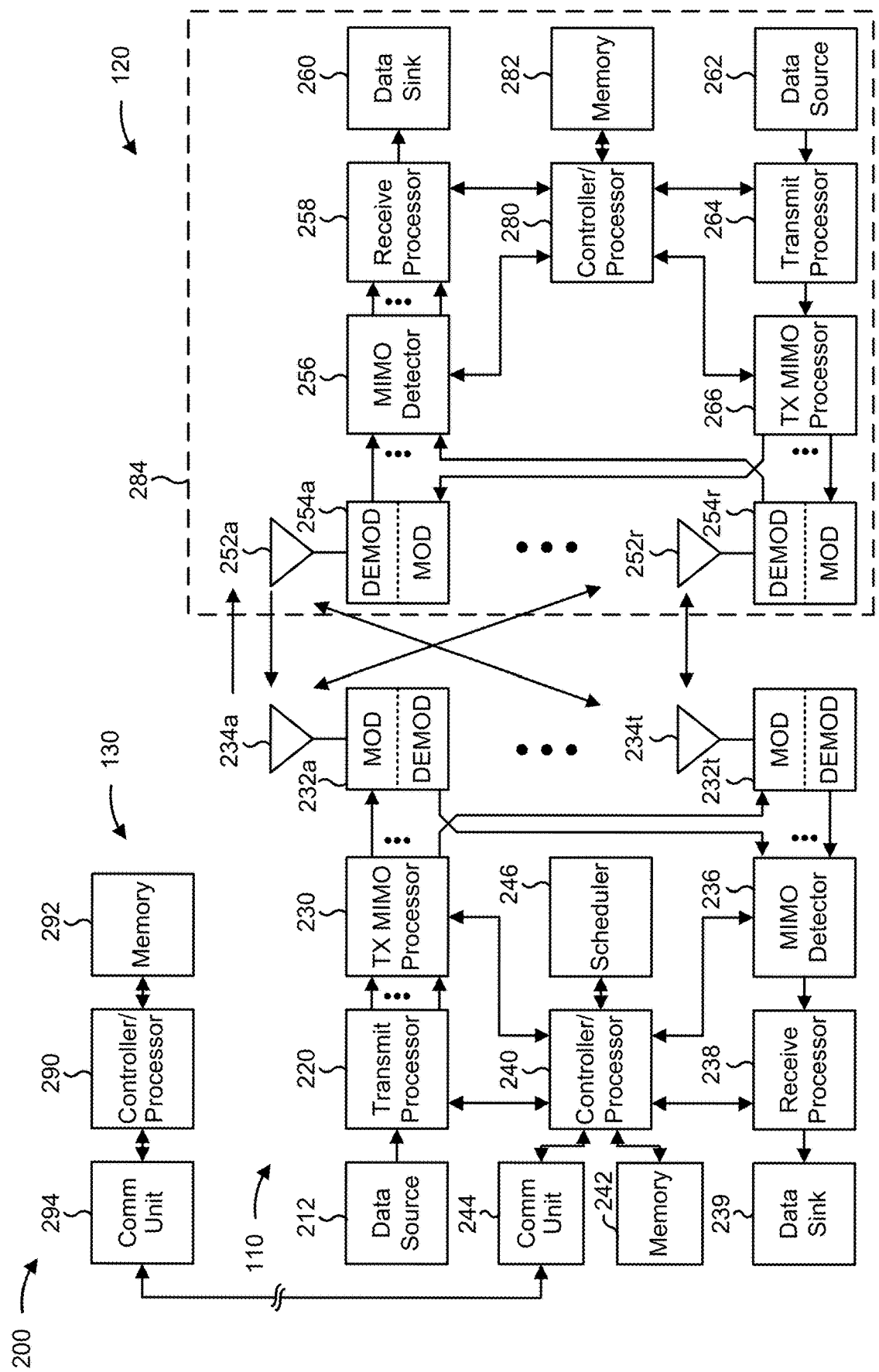
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with transmitting multiple downlink control information (DCI) messages in a control resource set (CORESET), as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, interpreting the instructions, and/or the like.

In some aspects, UE 120 may include means for receiving a first control signal in a CORESET from a first transmit receive point (TRP), wherein the first control signal includes a set of control channel elements (CCEs) to encode one or more of a first portion of a first DCI message or a first portion of a second DCI message, means for receiving a second control signal in the CORESET from a second TRP, wherein the second control signal includes the set of CCEs to encode one or more of a second portion of the first DCI message or a second portion of the second DCI message, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to UE 120, a first control signal in a CORESET via a first TRP associated with base station 110, wherein the first control signal includes a set of CCEs to encode one or more of a first portion of a first DCI message or a first portion of a second DCI message, means for transmitting, to UE 120, a second control signal in the CORESET via a second TRP associated with base station 110, wherein the second control signal includes the set of CCEs to encode one or more of a second portion of the first DCI message or a second portion of the second DCI message, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
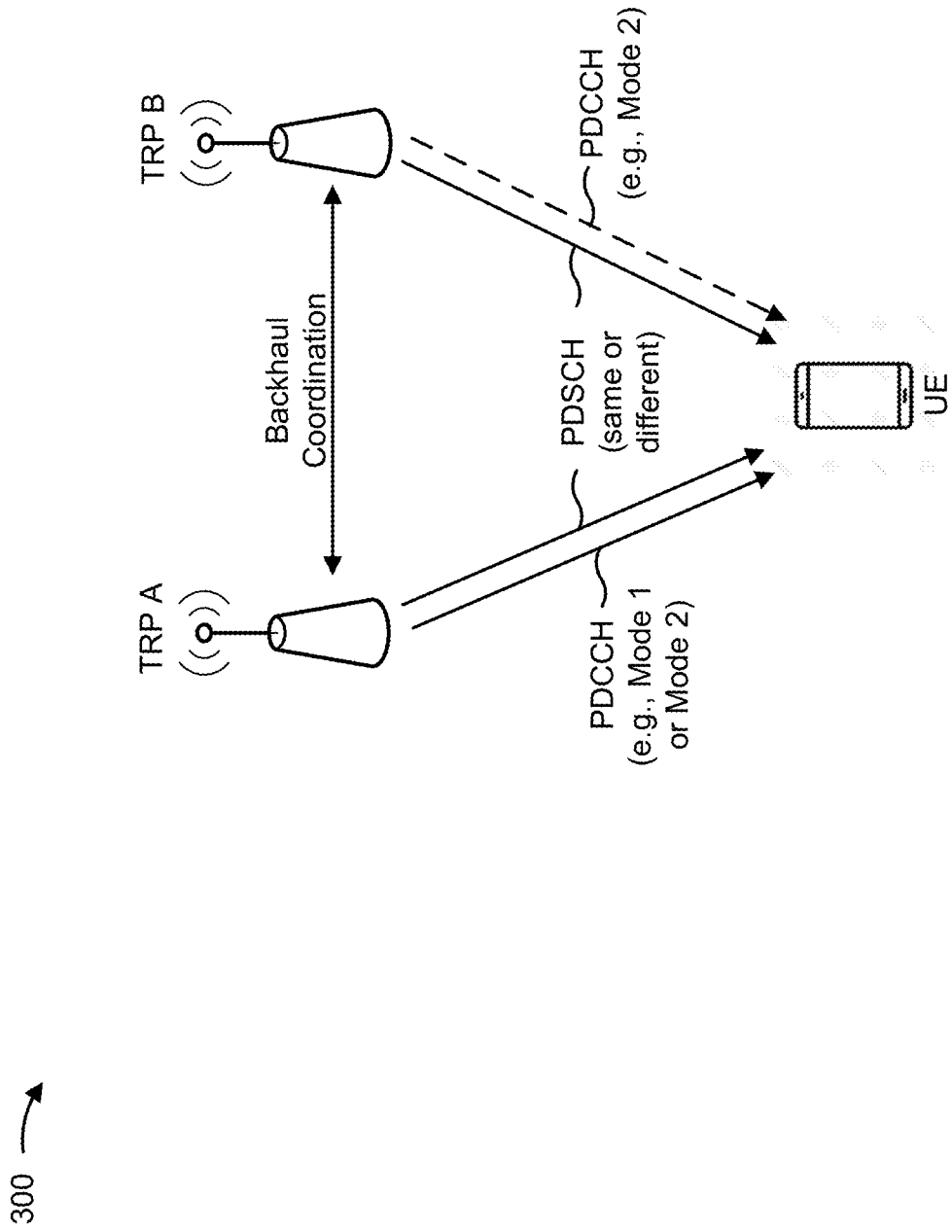
FIG. 3 is a diagram illustrating one or more examples of multi-transmit receive point (TRP) communication, in accordance with various aspects of the present disclosure.

FIG. 3 is a diagram illustrating one or more examples 300 of multi-TRP communication (sometimes referred to as multi-panel communication and/or the like), in accordance with various aspects of the present disclosure.

As shown in FIG. 3, multiple TRPs (shown as TRP A and TRP B) may communicate with a particular UE (e.g., UE 120) in a coordinated manner (e.g., using coordinated multipoint transmissions and/or the like) to improve diversity, improve reliability, increase throughput, and/or the like. In general, the TRPs may coordinate communications with the particular UE via a backhaul, which may have a smaller delay and/or a higher capacity when the TRPs are co-located at the same base station (e.g., different antenna arrays of the same base station). Alternatively, the backhaul may have a larger delay and/or a lower capacity (e.g., compared to co-location) when the TRPs are located at different base stations. In some aspects, the multiple TRPs may communicate with the UE 120 using different frequency resources (e.g., resource blocks (RBs)) in a frequency division multiplexing (FDM) scheme, using different time resources (e.g., symbols or slots) in a time division multiplexing (TDM) scheme, different spatial resources (e.g., quasi co-location (QCL) relationships, DMRS ports, spatial layers, and/or the like) in a spatial division multiplexing (SDM) scheme, and/or the like.

In a first multi-TRP transmission mode (e.g., Mode 1), the multiple TRPs may be configured to transmit a single physical downlink control channel (PDCCH) to schedule downlink data communications for a single physical downlink shared channel (PDSCH). In this case, the multiple TRPs may transmit communications to the UE on the same PDSCH. For example, different TRPs may transmit the PDSCH as a single codeword using different spatial layers (e.g., in an SDM scheme), different RBs (e.g., in an FDM scheme), different symbols or slots (e.g., in a TDM scheme), and/or the like. As another example, a PDSCH communication may be transmitted using multiple codewords, where different codewords are transmitted by different TRPs using different spatial layers, frequency resources, time resources, and/or the like. In either case, the different resources that the multiple TRPs use to transmit the PDSCH (e.g., different spatial layers, RBs, OFDM symbols, slots, and/or the like) may have different transmission configuration indication (TCI) states. For example, the PDCCH scheduling the PDSCH may include a single downlink control information (DCI) message having a TCI field to indicate the TCI state(s) for the PDSCH.

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP (e.g., TRP A), and a second PDCCH may schedule a second codeword to be transmitted by a second TRP (e.g., TRP B). Furthermore, first DCI (e.g., transmitted by the first TRP) may schedule a first PDSCH communication associated with a first TCI for the first TRP, and second DCI (e.g., transmitted by the second TRP) may schedule a second PDSCH communication associated with a second TCI for the second TRP. In this case, separate DCI may indicate TCI states for the multiple corresponding PDSCHs.

As indicated above, FIG. 3 is provided as one or more examples. Other examples may differ from what is described with regard to FIG. 3.

Figure 4A:
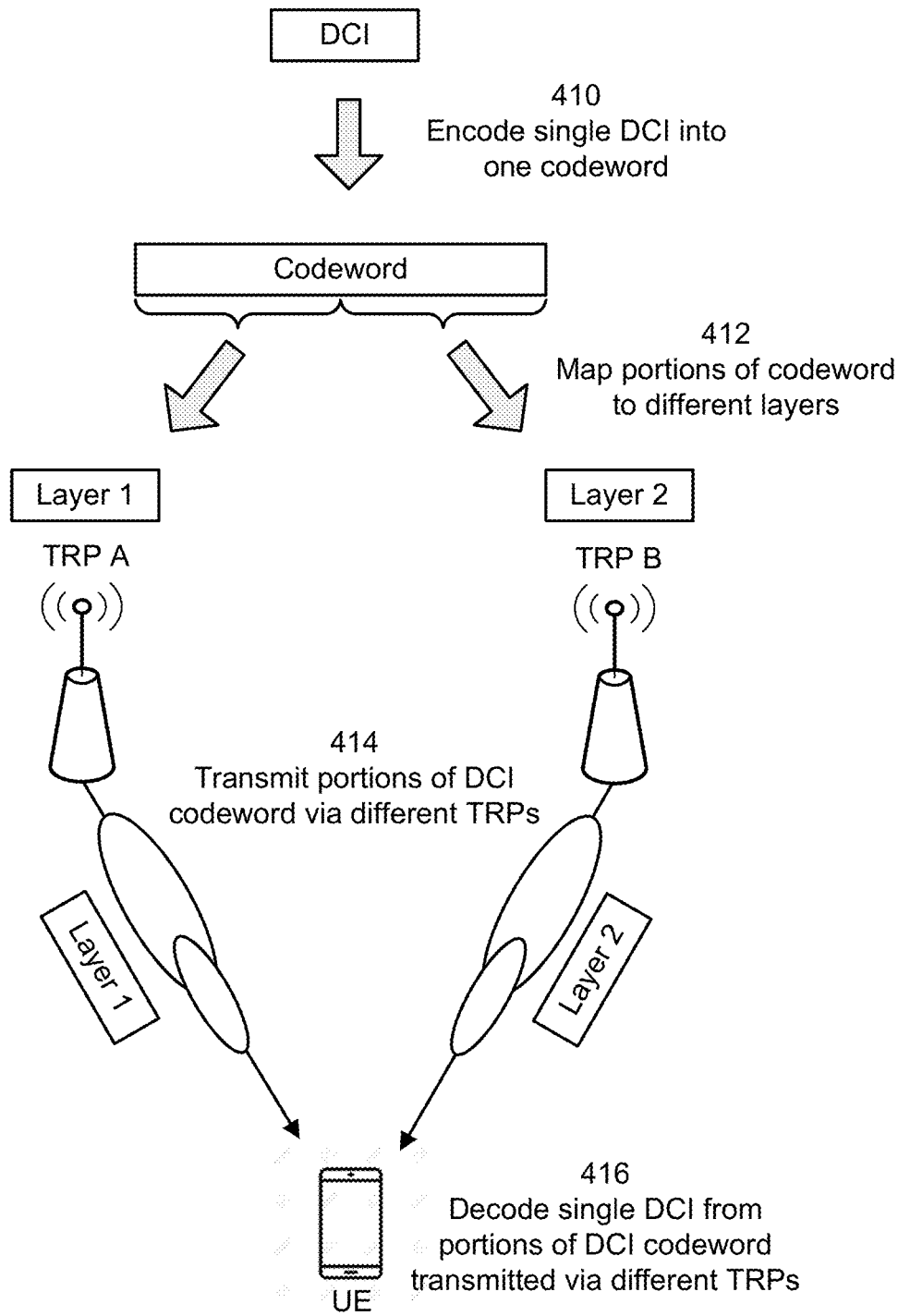
FIGS. 4A-4C are diagrams illustrating one or more examples of transmitting a single downlink control information (DCI) message via multiple TRPs, in accordance with various aspects of the present disclosure.
Figure 4B:
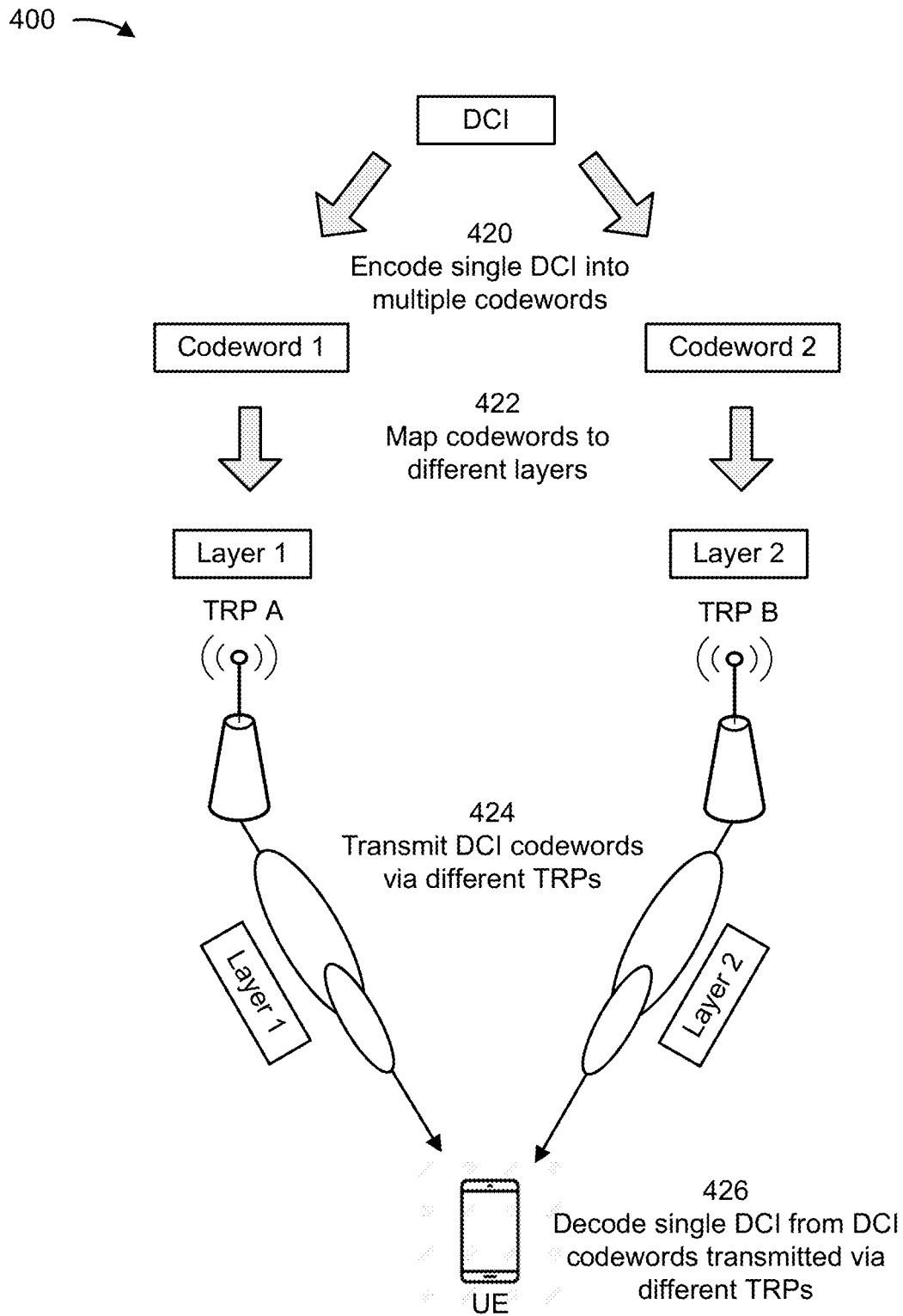
Figure 4C:
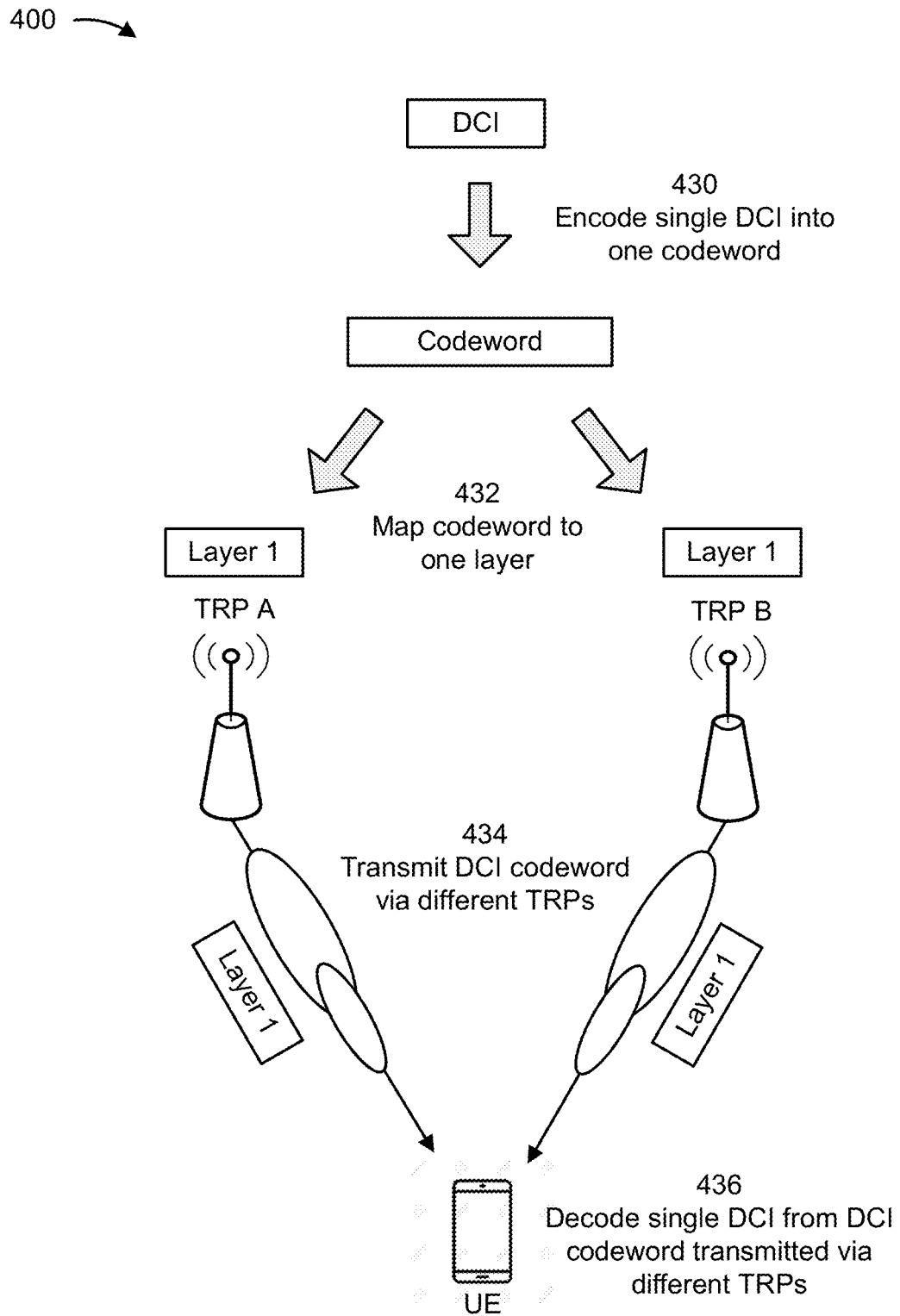

FIGS. 4A-4C are diagrams illustrating one or more examples 400 of transmitting a single DCI message via multiple TRPs, in accordance with various aspects of the present disclosure. As shown in FIGS. 4A-4C, multiple TRPs (shown as TRP A and TRP B) may communicate with a UE (e.g., UE 120) in a coordinated manner. In some aspects, the multiple TRPs may be included in a single base station (e.g., base station 110). In some aspects, the multiple TRPs may include different subsets of TRPs that are included in different base stations. Although FIGS. 4A-4C illustrate two TRPs communicating with the UE, in some aspects, a different quantity of TRPs (e.g., three TRPs, four TRPs, and/or the like) may communicate with the UE in multi-TRP operation. Some operations may be described herein as being performed by a base station. In general, such operations may be performed by a single TRP included in the base station, by multiple TRPs included in the base station, by one or more TRPs that are controlled by the base station, and/or the like.

In some aspects, as described herein, the example(s) 400 illustrated in FIGS. 4A-4C relate to various multi-TRP communication scenarios in which multiple TRPs transmit a single DCI to a UE using spatial diversity techniques. For example, in some aspects, the single DCI may include one or more uncoded bits that are related to an uplink resource allocation for the UE (e.g., a persistent or semi-persistent uplink grant, a resource block (RB) assignment, a transmit power control (TPC) command, hybrid automatic repeat request (HARD) configuration information, uplink beam activation information, and/or the like). Additionally, or alternatively, the single DCI may include one or more uncoded bits related to downlink data to be transmitted to the UE (e.g., an RB assignment, a precoding matrix indicator (PMI), a modulation coding scheme (MCS), downlink beam activation information, and/or the like).

As shown in FIG. 4A, in one spatial diversity technique, multiple TRPs may transmit a single DCI to the UE using one codeword and multiple layers. For example, as shown by reference number 410, a base station may encode the single DCI to be transmitted to the UE into one (long) codeword, which generally includes a set of coded bits corresponding to the single DCI. As further shown in FIG. 4A, the coded bits in the one codeword may be divided into multiple portions, such as a first portion to be transmitted via a first TRP (e.g., TRP A) and a second portion to be transmitted via a second TRP (e.g., TRP B). As further shown in FIG. 4A, and by reference number 412, the different portions of the codeword may be mapped to separate spatial layers. For example, in some aspects, the base station may perform a layer mapping to map the first portion of the codeword to a first spatial layer (shown as Layer 1) associated with the first TRP and to map the second portion of the codeword to a second spatial layer (shown as Layer 2) associated with the second TRP.

As further shown in FIG. 4A, and by reference number 414, the separate spatial layers may be transmitted to the UE via different TRPs. For example, the first TRP may transmit the first spatial layer to the UE, and the second TRP may transmit the second spatial layer to the UE. Accordingly, as shown by reference number 416, the UE may decode the single DCI based at least in part on the different portions of the DCI codeword that the different TRPs transmit via separate spatial layers. For example, in some aspects, each TRP may be associated with a TCI state, and the spatial layers mapped to the DCI codeword may each have a demodulation reference signal (DMRS) set associated with the corresponding TCI state. For example, the first spatial layer may have a first DMRS set associated with a first TCI state used by the first TRP, and the second spatial layer may have a second DMRS set associated with a second TCI state used by the second TRP. Accordingly, in some aspects, the UE may use the DMRS set associated with each spatial layer to decode the single DCI from the separate spatial layers mapped to the different portions of the codeword encoding the bits of the DCI.

As shown in FIG. 4B, in another spatial diversity technique, multiple TRPs may transmit a single DCI to the UE using multiple codewords and multiple layers. For example, as shown by reference number 420, a base station may encode the single DCI to be transmitted to the UE into separate codewords, each of which includes a set of coded bits corresponding to a portion of the single DCI. In general, the separate codewords that encode the bits of the single DCI may have a shorter length compared to the single (long) codeword in the spatial diversity technique described above with reference to FIG. 4A. As further shown in FIG. 4B, and by reference number 422, each of the codewords may be mapped to a separate spatial layer. For example, in some aspects, the base station may perform a layer mapping to map the first codeword to a first spatial layer associated with the first TRP and to map the second codeword to a second spatial layer associated with the second TRP.

As further shown in FIG. 4B, and by reference number 424, the separate spatial layers may be transmitted to the UE via different TRPs. For example, the first TRP may transmit the first spatial layer to the UE, and the second TRP may transmit the second spatial layer to the UE. Accordingly, as shown by reference number 426, the UE may decode the single DCI based at least in part on the different codewords that the different TRPs transmit via the separate spatial layers. For example, in some aspects, each TRP may be associated with a TCI state, and the spatial layers mapped to the DCI codeword may each have a DMRS set associated with the corresponding TCI state. Accordingly, in some aspects, the UE may use the DMRS set associated with each spatial layer to decode the single DCI from the separate spatial layers mapped to the separate codewords that encode the bits of the single DCI.

As shown in FIG. 4C, in another spatial diversity technique, multiple TRPs may transmit a single DCI to the UE using a single codeword and a single layer. For example, as shown by reference number 430, a base station may encode the single DCI to be transmitted to the UE into a single codeword that includes a set of coded bits corresponding to the single DCI. In general, the codeword that encodes the bits of the single DCI may have a shorter length compared to the single (long) codeword in the spatial diversity technique described above with reference to FIG. 4A, may have the same or a similar length as the separate codewords in the spatial diversity technique described above with reference to FIG. 4B, and/or the like. As further shown in FIG. 4C, and by reference number 432, the codeword may be mapped to a single spatial layer to be transmitted via multiple TRPs. For example, in some aspects, the base station may perform a layer mapping to map the codeword to the single spatial layer. In this case, the single spatial layer may have a DMRS set associated with different TCI states, including a first TCI state associated with the first TRP and a second TCI state associated with the second TRP. Additionally, or alternatively, the single spatial layer may have multiple DMRS sets that are associated with respective TCI states, such as a first DMRS set associated with the first TCI state and a second DMRS set associated with the second TCI state.

As further shown in FIG. 4C, and by reference number 434, the single spatial layer may be transmitted to the UE via different TRPs. For example, in some aspects, the first TRP and the second TRP may each transmit the same spatial layer to the UE. Accordingly, as shown by reference number 436, the UE may decode the single DCI based at least in part on the spatial layer transmitted via the different TRPs. For example, in some aspects, the UE may use the DMRS set associated with the TCI states for the different TRPs, respective DMRS sets associated with the TCI states for each individual TRP, and/or the like to decode the single DCI.

Accordingly, in the various spatial diversity techniques described above, multiple TRPs that are associated with different TCI states may be used to transmit a single DCI to the UE, which may enhance diversity, reliability, and/or the like for transmitting a physical downlink control channel (PDCCH) carrying the DCI. However, in some cases, a base station may have multiple DCI messages to transmit to a UE in a single control resource set (CORESET). For example, the base station may have multiple uplink grants per CORESET, multiple downlink grants per CORESET, intermittent PDCCH occasions, and/or the like. Accordingly, some aspects described herein relate to techniques and apparatuses to transmit multiple DCI messages in a single CORESET. For example, as described in further detail herein, the base station may transmit, to a UE, a first control signal in a CORESET via a first TRP associated with the base station and a second control signal in the CORESET via a second TRP associated with the base station. In some aspects, the first control signal may include a set of control channel elements (CCEs) to encode a first portion of a first DCI message and/or a first portion of a second DCI message, and the second control signal may include the set of CCEs to encode a second portion of the first DCI message and/or a second portion of the second DCI message. In this way, the base station may transmit, and the UE may receive, multiple DCI messages that are transmitted using the same CCEs in a CORESET via multiple TRPs, which may improve efficiency of communicating the multiple DCI messages to the UE, reduce congestion or other network overhead, reduce latency that may otherwise be introduced by communicating the multiple DCI messages to the UE in separate CORESETs and/or PDCCHs, and/or the like.

As indicated above, FIGS. 4A-4C are provided as one or more examples. Other examples may differ from what is described with regard to FIGS. 4A-4C.

Figure 5:
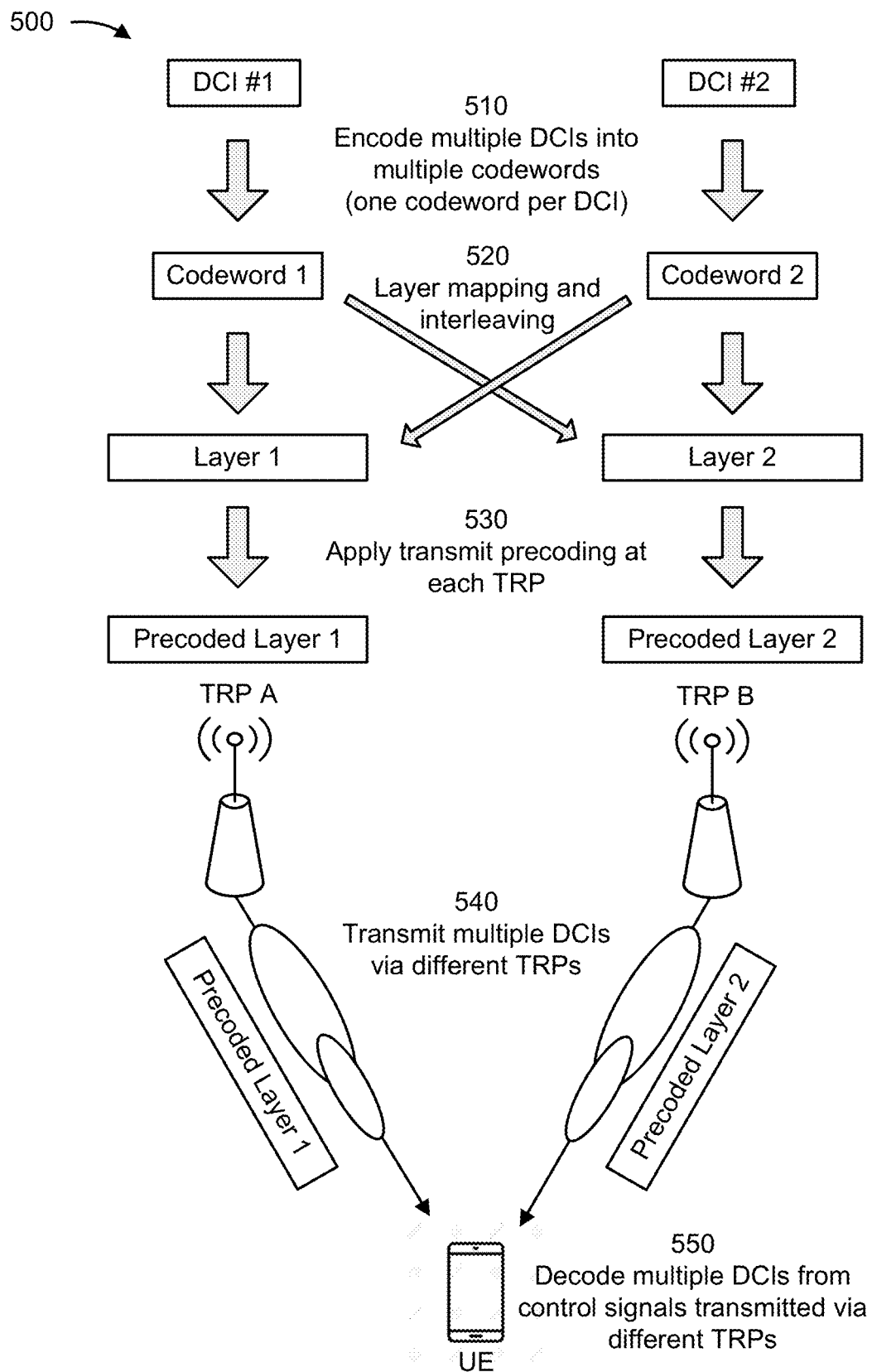
FIG. 5 is a diagram illustrating one or more examples of transmitting multiple DCI messages in a control resource set (CORESET), in accordance with various aspects of the present disclosure.

FIG. 5 is a diagram illustrating one or more examples 500 of transmitting multiple DCI messages in a CORESET, in accordance with various aspects of the present disclosure. As shown in FIG. 5, multiple TRPs (shown as TRP A and TRP B) may communicate with a UE (e.g., UE 120) in a coordinated manner. In some aspects, the multiple TRPs may be included in a single base station (e.g., base station 110). In some aspects, the multiple TRPs may include different subsets of TRPs that are included in different base stations. Although FIG. 5 illustrates two TRPs communicating with the UE, in some aspects, a different quantity of TRPs (e.g., three TRPs, four TRPs, and/or the like) may communicate with the UE in multi-TRP operation. Some operations may be described herein as being performed by a base station. In general, such operations may be performed by a single TRP included in the base station, by multiple TRPs included in the base station, by one or more TRPs that are controlled by the base station, and/or the like.

In some aspects, as described herein, the example(s) 500 illustrated in FIG. 5 relate to a multi-TRP communication scenario in which multiple TRPs may transmit multiple DCI messages to a UE using spatial multiplexing of PDCCHs in a CORESET with multiple TCI states. For example, in some aspects, the base station may define the CORESET as including a set of CCEs, and the base station may configure a control signal (e.g., a PDCCH) to be transmitted to the UE via different TRPs by using a subset of the CCEs in the CORESET. In general, the different TRPs may transmit the multiple DCI messages via respective control signals that use the same CCEs in the CORESET. For example, as shown in FIG. 5, and by reference number 510, the base station may encode the multiple DCI messages into multiple corresponding codewords (e.g., one codeword per DCI), which use the same set of CCEs to encode the DCI messages.

As further shown in FIG. 5, and by reference number 520, the base station may perform layer mapping and interleaving for the multiple codewords. For example, in some aspects, the base station may interleave a first portion of the first codeword and a first portion of the second codeword, and the interleaved portions of the first codeword and the second codeword may be mapped to a first spatial layer to be transmitted by a first TRP. Furthermore, in some aspects, the base station may interleave a second portion of the first codeword and a second portion of the second codeword, and the interleaved portions of the first codeword and the second codeword may be mapped to a second spatial layer to be transmitted by a second TRP. In this case, the multiple TRPs may each transmit different portions of the multiple DCI messages. Alternatively, in some cases, no interleaving may be performed for the first codeword and the second codeword. In this case, the first codeword may be mapped to the first spatial layer to be transmitted by the first TRP, and the second codeword may be mapped to the second spatial layer to be transmitted by the second TRP. In some aspects, the base station may transmit, and the UE may receive, UE-specific downlink signaling to indicate whether interleaving is used for the first and second codewords. For example, in some aspects, the UE-specific downlink signaling may include higher-layer signaling, such as radio resource control (RRC) signaling, a medium access control (MAC) control element (MAC-CE), non-access stratum (NAS) signaling, and/or the like. In either case, the separate spatial layers mapped to the multiple DCI messages may be transmitted to the UE via different TCI states (e.g., a first TCI state associated with the first TRP and a second TCI state associated with the second TRP).

As further shown in FIG. 5, and by reference number 530, the base station may configure the multiple TRPs to apply additional transmit precoding to the spatial layers that are mapped to the codewords corresponding to the multiple DCI. For example, in cases where the TRPs are configured to perform non-coherent joint transmission, the transmit precoding applied to the spatial layers may be based at least in part on an open-loop precoding technique such as large delay cyclic delay diversity. Additionally, or alternatively, in cases where the TRPs are configured to perform coherent joint transmission, the transmit precoding applied to the spatial layers at each TRP may be based at least in part on a closed-loop precoding technique and/or the like. Alternatively, in some cases, no precoding may be applied to the spatial layers. Accordingly, in some aspects, the base station may transmit, and the UE may receive, UE-specific downlink signaling to indicate whether precoding is applied at each TRP (e.g., RRC signaling, a MAC-CE, NAS signaling, or other higher-layer signaling).

As further shown in FIG. 5, and by reference number 540, the multiple DCI messages may be transmitted to the UE via different TRPs, which are associated with different TCI states. For example, in some aspects, the multiple DCI messages may be transmitted as separate precoded layers, each of which includes a different portion of the DCI messages that are interleaved with one another. Alternatively, in some aspects, the multiple DCI messages may be transmitted as separate interleaved layers with no precoding, as separate precoded layers with no interleaving, or as separate layers with no precoding and no interleaving. Accordingly, in some aspects, the first TRP may transmit a first spatial layer to the UE as a first control signal (e.g., a PDCCH) that includes a set of CCEs in a CORESET, and the second TRP may transmit a second spatial layer to the UE as a second control signal that includes the set of CCEs in the CORESET. For example, when interleaving is used, the set of CCEs included in the first control signal and the second control signal may encode different portions of the first DCI message and the second DCI message. Alternatively, when no interleaving is used, the set of CCEs included in the first control signal may encode the first DCI message only and the set of CCEs included in the second control signal may encode the second DCI message only. In any case, as shown by reference number 550, the UE may decode the multiple DCI messages based at least in part on the first control signal and the second control signal that are transmitted via the different TRPs.

In some aspects, the techniques described above may use spatial multiplexing of PDCCHs in a CORESET to transmit multiple DCI messages via different TCI states. However, in some aspects, the base station may configure a set of PDCCH candidates that are grouped into multiple different categories, such as a single TCI category, a multi-TCI spatial multiplexing category, a multi-TCI spatial diversity category, and/or the like. Accordingly, in some aspects, the base station may dynamically select a PDCCH candidate among the configured categories (e.g., may dynamically switch between transmitting the multiple DCI messages using a PDCCH candidate in the spatial multiplexing category, as in FIG. 5, individually transmitting the DCI messages using a PDCCH candidate in the spatial diversity category, as described above with reference to FIGS. 4A-4C, individually transmitting the DCI messages using a PDCCH candidate in the single TCI category, as described above with reference to FIG. 3, and/or the like). In this way, the base station may dynamically select the PDCCH to be used to transmit one or more DCI to the UE, to enhance diversity, improve reliability, reduce overhead, and/or the like based at least in part on channel conditions, performance requirements, UE capabilities, and/or the like.

As indicated above, FIG. 5 is provided as one or more examples. Other examples may differ from what is described with regard to FIG. 5.

Figure 6:
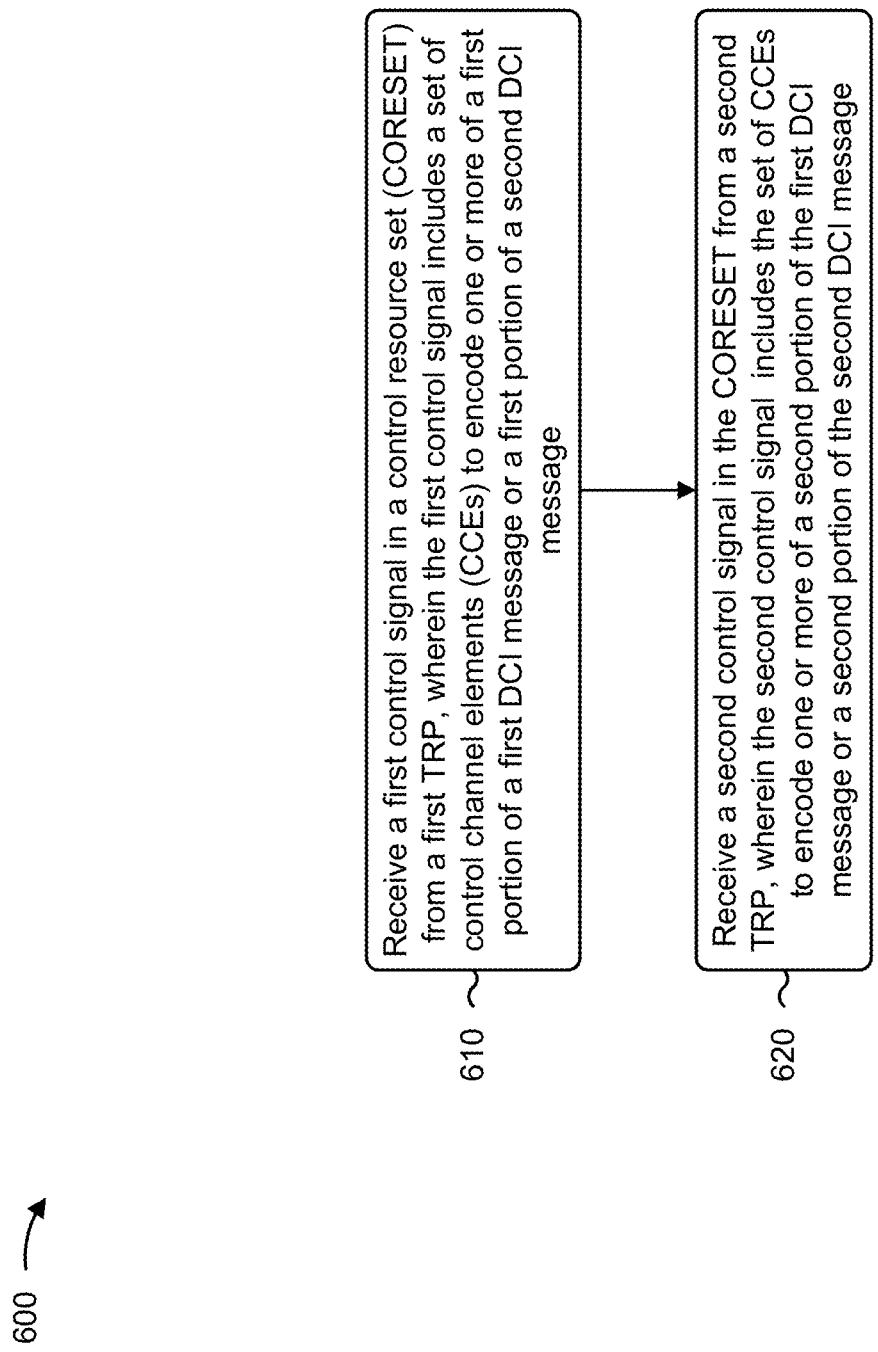
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with transmitting multiple DCI messages in a CORESET.

As shown in FIG. 6, in some aspects, process 600 may include receiving a first control signal in a CORESET from a first TRP, wherein the first control signal includes a set of CCEs to encode one or more of a first portion of a first DCI message or a first portion of a second DCI message (block 610). For example, the UE may receive (e.g., using antenna 252, DEMOD 254, MIMO detector 256, receive processor 258, controller/processor 280, memory 282, and/or the like) a first control signal in a CORESET from a first TRP, as described above. In some aspects, the first control signal includes a set of CCEs to encode one or more of a first portion of a first DCI message or a first portion of a second DCI message.

As further shown in FIG. 6, in some aspects, process 600 may include receiving a second control signal in the CORESET from a second TRP, wherein the second control signal includes the set of CCEs to encode one or more of a second portion of the first DCI message or a second portion of the second DCI message (block 620). For example, the UE may receive (e.g., using antenna 252, DEMOD 254, MIMO detector 256, receive processor 258, controller/processor 280, memory 282, and/or the like) a second control signal in the CORESET from a second TRP, as described above. In some aspects, the second control signal includes the set of CCEs to encode one or more of a second portion of the first DCI message or a second portion of the second DCI message.

Process 600 may include additional aspects, such as any single aspect or any combination of aspects described below and/or in connection with one or more other processes described elsewhere herein.

In a first aspect, process 600 includes decoding the first DCI message based at least in part on the first control signal and the second control signal, and decoding the second DCI message based at least in part on the first control signal and the second control signal.

In a second aspect, alone or in combination with the first aspect, the first DCI message and the second DCI message are decoded based at least in part on transmit precoding applied at the first TRP and the second TRP.

In a third aspect, alone or in combination with one or more of the first and second aspects, the transmit precoding applied at the first TRP and the second TRP includes open-loop precoding based at least in part on the first TRP and the second TRP implementing non-coherent joint transmission for the first control signal and the second control signal.

In a fourth aspect, alone or in combination with one or more of the first through third aspects, the transmit precoding applied at the first TRP and the second TRP includes closed-loop precoding based at least in part on the first TRP and the second TRP implementing coherent joint transmission for the first control signal and the second control signal.

In a fifth aspect, alone or in combination with one or more of the first through fourth aspects, process 600 includes receiving UE-specific downlink signaling indicating the transmit precoding applied at the first TRP and the second TRP.

In a sixth aspect, alone or in combination with one or more of the first through fifth aspects, the first portion of the first DCI message and the first portion of the second DCI message are interleaved in the set of CCEs associated with the first control signal, and the second portion of the first DCI message and the second portion of the second DCI message are interleaved in the set of CCEs associated with the second control signal.

In a seventh aspect, alone or in combination with one or more of the first through sixth aspects, the first TRP is associated with a first TCI state and the second TRP is associated with a second TCI state.

In an eighth aspect, alone or in combination with one or more of the first through seventh aspects, the first control signal and the second control signal are associated with a PDCCH candidate in a spatial multiplexing category.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a base station, in accordance with various aspects of the present disclosure. Example process 700 is an example where the base station (e.g., base station 110 and/or the like) performs operations associated with transmitting multiple DCI messages in a CORESET.

As shown in FIG. 7, in some aspects, process 700 may include transmitting, to a UE, a first control signal in a CORESET via a first TRP associated with the at least one base station, wherein the first control signal includes a set of CCEs to encode one or more of a first portion of a first DCI message or a first portion of a second DCI message (block 710). For example, the base station may transmit (e.g., using controller/processor 240, transmit processor 220, TX MIMO processor 230, MOD 232, antenna 234, and/or the like), to a UE, a first control signal in a CORESET via a first TRP associated with the at least one base station, as described above. In some aspects, the first control signal includes a set of CCEs to encode one or more of a first portion of a first DCI message or a first portion of a second DCI message.

As further shown in FIG. 7, in some aspects, process 700 may include transmitting, to the UE, a second control signal in the CORESET via a second TRP associated with the at least one base station, wherein the second control signal includes the set of CCEs to encode one or more of a second portion of the first DCI message or a second portion of the second DCI message (block 720). For example, the base station may transmit (e.g., using controller/processor 240, transmit processor 220, TX MIMO processor 230, MOD 232, antenna 234, and/or the like), to the UE, a second control signal in the CORESET via a second TRP associated with the at least one base station, as described above. In some aspects, the second control signal includes the set of CCEs to encode one or more of a second portion of the first DCI message or a second portion of the second DCI message.

Process 700 may include additional aspects, such as any single aspect or any combination of aspects described below and/or in connection with one or more other processes described elsewhere herein.

In a first aspect, process 700 includes configuring the first TRP to apply transmit precoding to the first control signal, and configuring the second TRP to apply transmit precoding to the second control signal.

In a second aspect, alone or in combination with the first aspect, the transmit precoding applied at the first TRP and the second TRP includes open-loop precoding based at least in part on the first TRP and the second TRP implementing non-coherent joint transmission for the first control signal and the second control signal.

In a third aspect, alone or in combination with one or more of the first and second aspects, the transmit precoding applied at the first TRP and the second TRP includes closed-loop precoding based at least in part on the first TRP and the second TRP implementing coherent joint transmission for the first control signal and the second control signal.

In a fourth aspect, alone or in combination with one or more of the first through third aspects, process 700 includes transmitting, to the UE, UE-specific downlink signaling indicating the transmit precoding applied at the first TRP and the second TRP.

In a fifth aspect, alone or in combination with one or more of the first through fourth aspects, process 700 includes configuring the first TRP to interleave the first portion of the first DCI message and the first portion of the second DCI message in the set of CCEs associated with the first control signal, and configuring the second TRP to interleave the second portion of the first DCI message and the second portion of the second DCI message in the set of CCEs associated with the second control signal.

In a sixth aspect, alone or in combination with one or more of the first through fifth aspects, the first TRP is associated with a first TCI state and the second TRP is associated with a second TCI state.

In a seventh aspect, alone or in combination with one or more of the first through sixth aspects, the first control signal and the second control signal are associated with a PDCCH candidate in a spatial multiplexing category.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of aspects of the present disclosure:

Aspect 1: A method of wireless communication performed by a UE, comprising: receiving a first control signal in a CORESET from a first TRP, wherein the first control signal includes a set of CCEs to encode one or more of a first portion of a first DCI message or a first portion of a second DCI message; and receiving a second control signal in the CORESET from a second TRP, wherein the second control signal includes the set of CCEs to encode one or more of a second portion of the first DCI message or a second portion of the second DCI message.

Aspect 2: The method of aspect 1, further comprising: decoding the first DCI message based at least in part on the first control signal and the second control signal; and decoding the second DCI message based at least in part on the first control signal and the second control signal.

Aspect 3: The method of any one of aspects 1-2, wherein the first DCI message and the second DCI message are decoded based at least in part on transmit precoding applied at the first TRP and the second TRP.

Aspect 4: The method of aspect 3, wherein the transmit precoding applied at the first TRP and the second TRP includes open-loop precoding based at least in part on the first TRP and the second TRP implementing non-coherent joint transmission for the first control signal and the second control signal.

Aspect 5: The method of aspect 3, wherein the transmit precoding applied at the first TRP and the second TRP includes closed-loop precoding based at least in part on the first TRP and the second TRP implementing coherent joint transmission for the first control signal and the second control signal.

Aspect 6: The method of any one of aspects 3-5, further comprising: receiving UE-specific downlink signaling indicating the transmit precoding applied at the first TRP and the second TRP.

Aspect 7: The method of any one of aspects 1-6, wherein the first portion of the first DCI message and the first portion of the second DCI message are interleaved in the set of CCEs associated with the first control signal, and wherein the second portion of the first DCI message and the second portion of the second DCI message are interleaved in the set of CCEs associated with the second control signal.

Aspect 8: The method of any one of aspects 1-7, wherein the first TRP is associated with a first TCI state and the second TRP is associated with a second TCI state.

Aspect 9: The method of any one of aspects 1-8, wherein the first control signal and the second control signal are associated with a PDCCH candidate in a spatial multiplexing category.

Aspect 10: A method of wireless communication performed by at least one base station, comprising: transmitting, to a UE, a first control signal in a CORESET via a first TRP associated with the at least one base station, wherein the first control signal includes a set of CCEs to encode one or more of a first portion of a first DCI message or a first portion of a second DCI message; and transmitting, to the UE, a second control signal in the CORESET via a second TRP associated with the at least one base station, wherein the second control signal includes the set of CCEs to encode one or more of a second portion of the first DCI message or a second portion of the second DCI message.

Aspect 11: The method of aspect 10, further comprising: configuring the first TRP to apply transmit precoding to the first control signal; and configuring the second TRP to apply transmit precoding to the second control signal.

Aspect 12: The method of aspect 11, wherein the transmit precoding applied at the first TRP and the second TRP includes open-loop precoding based at least in part on the first TRP and the second TRP implementing non-coherent joint transmission for the first control signal and the second control signal.

Aspect 13: The method of aspect 11, wherein the transmit precoding applied at the first TRP and the second TRP includes closed-loop precoding based at least in part on the first TRP and the second TRP implementing coherent joint transmission for the first control signal and the second control signal.

Aspect 14: The method of any one of aspects 11-13, further comprising: transmitting, to the UE, UE-specific downlink signaling indicating the transmit precoding applied at the first TRP and the second TRP.

Aspect 15: The method of any one of aspects 10-14, further comprising: configuring the first TRP to interleave the first portion of the first DCI message and the first portion of the second DCI message in the set of CCEs associated with the first control signal; and configuring the second TRP to interleave the second portion of the first DCI message and the second portion of the second DCI message in the set of CCEs associated with the second control signal.

Aspect 16: The method of any one of aspects 10-15, wherein the first TRP is associated with a first TCI state and the second TRP is associated with a second TCI state.

Aspect 17: The method of any one of aspects 10-16, wherein the first control signal and the second control signal are associated with a physical downlink control channel candidate in a spatial multiplexing category.

Aspect 18: An apparatus for wireless communication at a device, comprising a processor; memory coupled with the processor; and instructions stored in the memory and executable by the processor to cause the apparatus to perform the method of one or more aspects of aspects 1-9.

Aspect 19: A device for wireless communication, comprising a memory and one or more processors coupled to the memory, the memory and the one or more processors configured to perform the method of one or more aspects of aspects 1-9.

Aspect 20: An apparatus for wireless communication, comprising at least one means for performing the method of one or more aspects of aspects 1-9.

Aspect 21: A non-transitory computer-readable medium storing code for wireless communication, the code comprising instructions executable by a processor to perform the method of one or more aspects of aspects 1-9.

Aspect 22: A non-transitory computer-readable medium storing a set of instructions for wireless communication, the set of instructions comprising one or more instructions that, when executed by one or more processors of a device, cause the device to perform the method of one or more aspects of aspects 1-9.

Aspect 23: An apparatus for wireless communication at a device, comprising a processor; memory coupled with the processor; and instructions stored in the memory and executable by the processor to cause the apparatus to perform the method of one or more aspects of aspects 10-17.

Aspect 24: A device for wireless communication, comprising a memory and one or more processors coupled to the memory, the memory and the one or more processors configured to perform the method of one or more aspects of aspects 10-17.

Aspect 25: An apparatus for wireless communication, comprising at least one means for performing the method of one or more aspects of aspects 10-17.

Aspect 26: A non-transitory computer-readable medium storing code for wireless communication, the code comprising instructions executable by a processor to perform the method of one or more aspects of aspects 10-17.

Aspect 27: A non-transitory computer-readable medium storing a set of instructions for wireless communication, the set of instructions comprising one or more instructions that, when executed by one or more processors of a device, cause the device to perform the method of one or more aspects of aspects 10-17.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving a first control signal in a control resource set (CORESET) from a first transmit receive point (TRP), wherein the first control signal includes a set of control channel elements (CCEs) to encode a first portion of a first downlink control information (DCI) message; and
receiving a second control signal in the CORESET from a second TRP, wherein the second control signal includes the set of CCEs to encode a second portion of the first DCI message.

2. The method of claim 1, further comprising:
decoding the first DCI message based at least in part on the first control signal and the second control signal; and
decoding a second DCI message based at least in part on the first control signal and the second control signal, wherein the first control signal includes the set of CCEs further to encode a first portion of the second DCI message, and wherein the second control signal includes the set of CCEs further to encode a second portion of the second DCI message.

3. The method of claim 2, wherein the first DCI message and the second DCI message are decoded based at least in part on transmit precoding applied at the first TRP and the second TRP.

4. The method of claim 3, wherein the transmit precoding applied at the first TRP and the second TRP includes open-loop precoding based at least in part on the first TRP and the second TRP implementing non-coherent joint transmission for the first control signal and the second control signal.

5. The method of claim 3, wherein the transmit precoding applied at the first TRP and the second TRP includes closed-loop precoding based at least in part on the first TRP and the second TRP implementing coherent joint transmission for the first control signal and the second control signal.

6. The method of claim 3, further comprising:
receiving UE-specific downlink signaling indicating the transmit precoding applied at the first TRP and the second TRP.

7. The method of claim 1, wherein the first control signal includes the set of CCEs further to encode a first portion of a second DCI message,
wherein the second control signal includes the set of CCEs further to encode a second portion of the second DCI message,
wherein the first portion of the first DCI message and the first portion of the second DCI message are interleaved in the set of CCEs associated with the first control signal, and
wherein the second portion of the first DCI message and the second portion of the second DCI message are interleaved in the set of CCEs associated with the second control signal.

8. The method of claim 1, wherein the first TRP is associated with a first transmission configuration indication (TCI) state and the second TRP is associated with a second TCI state.

9. The method of claim 1, wherein the first control signal and the second control signal are associated with a physical downlink control channel candidate in a spatial multiplexing category.

10. A method of wireless communication performed by at least one base station, comprising:
transmitting, to a user equipment (UE), a first control signal in a control resource set (CORESET) via a first transmit receive point (TRP) associated with the at least one base station, wherein the first control signal includes a set of control channel elements (CCEs) to encode a first portion of a first downlink control information (DCI) message; and
transmitting, to the UE, a second control signal in the CORESET via a second TRP associated with the at least one base station, wherein the second control signal includes the set of CCEs to encode a second portion of the first DCI message.

11. The method of claim 10, further comprising:
configuring the first TRP to apply transmit precoding to the first control signal; and
configuring the second TRP to apply transmit precoding to the second control signal.

12. The method of claim 11, wherein the transmit precoding applied at the first TRP and the second TRP includes open-loop precoding based at least in part on the first TRP and the second TRP implementing non-coherent joint transmission for the first control signal and the second control signal.

13. The method of claim 11, wherein the transmit precoding applied at the first TRP and the second TRP includes closed-loop precoding based at least in part on the first TRP and the second TRP implementing coherent joint transmission for the first control signal and the second control signal.

14. The method of claim 11, further comprising:
transmitting, to the UE, UE-specific downlink signaling indicating the transmit precoding applied at the first TRP and the second TRP.

15. The method of claim 10, wherein the first control signal includes the set of CCEs further to encode a first portion of a second DCI message and the second control signal includes the set of CCEs further to encode a second portion of the second DCI message, and wherein the method further comprises:
configuring the first TRP to interleave the first portion of the first DCI message and the first portion of the second DCI message in the set of CCEs associated with the first control signal; and
configuring the second TRP to interleave the second portion of the first DCI message and the second portion of the second DCI message in the set of CCEs associated with the second control signal.

16. The method of claim 10, wherein the first TRP is associated with a first transmission configuration indication (TCI) state and the second TRP is associated with a second TCI state.

17. The method of claim 10, wherein the first control signal and the second control signal are associated with a physical downlink control channel candidate in a spatial multiplexing category.

18. A user equipment (UE) for wireless communication, comprising:
a memory; and
one or more processors, coupled to the memory, configured to:
receive a first control signal in a control resource set (CORESET) from a first transmit receive point (TRP), wherein the first control signal includes a set of control channel elements (CCEs) to encode a first portion of a first downlink control information (DCI) message; and
receive a second control signal in the CORESET from a second TRP, wherein the second control signal includes the set of CCEs to encode a second portion of the first DCI message.

19. The UE of claim 18, wherein the one or more processors are further configured to:
decode the first DCI message based at least in part on the first control signal and the second control signal; and
decode a second DCI message based at least in part on the first control signal and the second control signal, wherein the first control signal includes the set of CCEs further to encode a first portion of the second DCI message, and wherein the second control signal includes the set of CCEs further to encode a second portion of the second DCI message.

20. The UE of claim 19, wherein the first DCI message and the second DCI message are decoded based at least in part on transmit precoding applied at the first TRP and the second TRP.

21. The UE of claim 20, wherein the one or more processors are further configured to:
receive UE-specific downlink signaling indicating the transmit precoding applied at the first TRP and the second TRP.

22. The UE of claim 18, wherein the first control signal includes the set of CCEs further to encode a first portion of a second DCI message,
wherein the second control signal includes the set of CCEs further to encode a second portion of the second DCI message,
wherein the first portion of the first DCI message and the first portion of the second DCI message are interleaved in the set of CCEs associated with the first control signal, and
wherein the second portion of the first DCI message and the second portion of the second DCI message are interleaved in the set of CCEs associated with the second control signal.

23. The UE of claim 18, wherein the first TRP is associated with a first transmission configuration indication (TCI) state and the second TRP is associated with a second TCI state.

24. The UE of claim 18, wherein the first control signal and the second control signal are associated with a physical downlink control channel candidate in a spatial multiplexing category.

25. A base station for wireless communication, comprising:
a memory; and
one or more processors, coupled to the memory, configured to:
transmit, to a user equipment (UE), a first control signal in a control resource set (CORESET) via a first transmit receive point (TRP) associated with the base station, wherein the first control signal includes a set of control channel elements (CCEs) to encode a first portion of a first downlink control information (DCI) message; and
transmit, to the UE, a second control signal in the CORESET via a second TRP associated with the base station, wherein the second control signal includes the set of CCEs to encode a second portion of the first DCI message.

26. The base station of claim 25, wherein the one or more processors are further configured to:
configure the first TRP to apply transmit precoding to the first control signal; and
configure the second TRP to apply transmit precoding to the second control signal.

27. The base station of claim 26, wherein the one or more processors are further configured to:
transmit, to the UE, UE-specific downlink signaling indicating the transmit precoding applied at the first TRP and the second TRP.

28. The base station of claim 25, wherein the first control signal includes the set of CCEs further to encode a first portion of a second DCI message and the second control signal includes the set of CCEs further to encode a second portion of the second DCI message, and wherein the one or more processors are further configured to:
configure the first TRP to interleave the first portion of the first DCI message and the first portion of the second DCI message in the set of CCEs associated with the first control signal; and
configure the second TRP to interleave the second portion of the first DCI message and the second portion of the second DCI message in the set of CCEs associated with the second control signal.

29. The base station of claim 25, wherein the first TRP is associated with a first transmission configuration indication (TCI) state and the second TRP is associated with a second TCI state.

30. The base station of claim 25, wherein the first control signal and the second control signal are associated with a physical downlink control channel candidate in a spatial multiplexing category.

* * * * *